United States Patent
Monastyrsky et al.

(10) Patent No.: US 11,216,555 B2
(45) Date of Patent: Jan. 4, 2022

(54) SYSTEM AND METHOD OF PROVIDING A SET OF CONVOLUTIONS TO A COMPUTING DEVICE FOR DETECTING ANOMALOUS EVENTS

(71) Applicant: AO Kaspersky Lab, Moscow (RU)

(72) Inventors: Alexey V. Monastyrsky, Moscow (RU); Mikhail A. Pavlyushchik, Moscow (RU); Alexey M. Romanenko, Moscow (RU); Maxim Y. Golovkin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 166 days.

(21) Appl. No.: 16/701,556

(22) Filed: Dec. 3, 2019

(65) Prior Publication Data

US 2020/0104487 A1    Apr. 2, 2020

Related U.S. Application Data

(63) Continuation of application No. 15/725,693, filed on Oct. 5, 2017, now Pat. No. 10,528,727, which is a (Continued)

(51) Int. Cl.
*G06F 21/00* (2013.01)
*G06F 21/55* (2013.01)
(Continued)

(52) U.S. Cl.
CPC ............ *G06F 21/554* (2013.01); *G06F 21/52* (2013.01); *G06F 21/54* (2013.01); *G06F 21/56* (2013.01);
(Continued)

(58) Field of Classification Search
CPC ..................................................... G06F 21/554
(Continued)

(56) References Cited

U.S. PATENT DOCUMENTS

2009/0300761 A1 * 12/2009 Park ...................... G06F 21/562
                                                                   726/23
2011/0099633 A1 *  4/2011 Aziz ................... H04L 63/1408
                                                                   726/24
(Continued)

FOREIGN PATENT DOCUMENTS

JP          2017505935 A       2/2017

*Primary Examiner* — Anthony D Brown
(74) *Attorney, Agent, or Firm* — Arent Fox LLP; Michael Fainberg

(57) ABSTRACT

A system and method is provided for providing a set of convolutions to a computing device for detecting anomalous events occurring in an operating system of the computing device. An exemplary method includes launching an agent in an operating system of a client device, registering, by the agent, events occurring in the operating system, for each registered event, determining a context of the event, wherein the context comprises a call stack at a moment of occurrence of the event, selecting a set of features based on the call stack of the event, generating a convolution based on the selected set of features of the event and the context of the event, and adding the generated convolution to a set of convolutions of events occurring on client devices, and providing, to a client device from which a request is received, the set of convolutions of events occurring on client devices.

21 Claims, 5 Drawing Sheets

Related U.S. Application Data continuation of application No. 15/720,334, filed on Sep. 29, 2017, now Pat. No. 10,489,586.

(51) Int. Cl.
| | | |
|---|---|---|
| *G06F 21/52* | (2013.01) | |
| *G06F 21/56* | (2013.01) | |
| *H04W 12/128* | (2021.01) | |
| *G06F 21/54* | (2013.01) | |
| *H04L 29/06* | (2006.01) | |

(52) U.S. Cl.
CPC .......... *G06F 21/561* (2013.01); *G06F 21/563* (2013.01); *H04L 63/1408* (2013.01); *H04L 63/1441* (2013.01); *H04W 12/128* (2021.01); *G06F 2221/033* (2013.01); *G06F 2221/034* (2013.01); *H04L 63/145* (2013.01)

(58) Field of Classification Search
USPC .......................................................... 726/23
See application file for complete search history.

(56) References Cited

U.S. PATENT DOCUMENTS

2013/0263206 A1* 10/2013 Nefedov ............. G06F 21/6245
726/1
2017/0124319 A1   5/2017 Peleg et al.

* cited by examiner

SYSTEM AND METHOD OF PROVIDING A SET OF CONVOLUTIONS TO A COMPUTING DEVICE FOR DETECTING ANOMALOUS EVENTS

CROSS-REFERENCE TO RELATED APPLICATIONS

This application is a continuation of U.S. application Ser. No. 15/725,693 filed on Oct. 5, 2017, which is a continuation of U.S. application Ser. No. 15/720,334 filed on Sep. 29, 2017, which claims the benefit of priority under 35 U.S.C. 119(a)-(d) to a Russian Application No. 2017121120 filed on Jun. 16, 2017, both of which are incorporated by reference herein in its entirety.

FIELD OF TECHNOLOGY

The present disclosure relates generally to the field of computer security and, more particularly, to a system and method for protecting computer devices against the exploitation of vulnerabilities present in the device software.

BACKGROUND

With the current widespread use and variation of software applications in today's technology world, one of the most widespread methods of penetrating computer devices with malicious software involves the exploitation of vulnerabilities present in the software installed on the particular device.

To prevent the exploitation of vulnerabilities, companies and/or individuals will use both passive methods in the form of eliminating the vulnerabilities themselves and active methods in the form of detecting the actual exploiting of vulnerabilities. Passive methods are used for already known vulnerabilities, whereas active methods are used for both known and unknown vulnerabilities.

Existing detection technologies are in fact capable of detecting the actual exploiting of a vulnerability with the use of known techniques and mechanisms, but unfortunately these methods are not able to detect and prevent new techniques of exploitation of vulnerabilities that employ new principles and mechanisms of exploitation. For example, in order to make the execution of shellcodes (i.e., a small piece of code used as the payload in the exploitation of a software vulnerability) impossible, technologies have been developed that prevent execution in the stack, but in their place techniques of return-oriented programming have appeared. In general, return-oriented programming are computer security exploit techniques that allows an attacker to execute code in the presence of security defenses such as non-executable memory and code signing.

The existing defensive technologies have proven to be powerless against return-oriented programming. Thus, new solutions, for example, as described in U.S. Patent Publication No. 2016/0196428, have been developed to protect against these attacks. In view of these new solutions, there remains a need to detect a deviation in the functioning of a computer system from normal operation, which might indicate that the system has been attacked by a technique of exploiting a vulnerability in the software. The solving of this problem would make it possible to move away from the techniques of exploitation of vulnerabilities themselves, which are changing and improving, to focus on external symptoms of an attack, which remain the same when the techniques change.

SUMMARY

Accordingly, as disclosed herein, exemplary systems and methods are provided to detect anomalous events occurring in an operating system of a computing device. In particular, the disclosed systems and methods provide a set of convolutions to a computing device for detecting anomalous events occurring in an operating system of the computing device.

Thus, according to an exemplary aspect, the present disclosure describes a method for providing a set of convolutions to a computing device for detecting anomalous events occurring in an operating system of the computing device. In one aspect, the method comprises launching an agent in an operating system of a client device; registering, by the agent, events occurring in the operating system of the client device; for each registered event occurring in the operating system of the client device, determining a context of the event, wherein the context comprises a call stack at a moment of occurrence of the event; selecting a set of features based on the call stack of the event; generating a convolution based on the selected set of features of the event and the context of the event; and adding the generated convolution to a set of convolutions of events occurring on client devices; and providing, to a client device from which a request is received, the set of convolutions of events occurring on client devices, the set of convolutions being provided to the client device for detecting anomalous events.

In one aspect, the events occurring in the operating system of the client device comprise at least one of: a launching of a process, a loading of a computer executable program code, a file operation, and a registry operation.

In one aspect, the providing of the set of convolutions to the client device comprises loading the set of convolutions onto the client device.

In one aspect, the providing of the set of convolutions to the client device comprises organizing a polling of a database without loading the set of convolutions into a local database of the client device.

In one aspect, the method further comprises registering, by an agent of a client device, at least one unclassified event; and determining, by the agent of the client device, whether or not the at least one unclassified event is anomalous based on a comparison of a convolution generated based on selected features of the unclassified event with the set of convolutions of events occurring on client devices.

In one aspect, the method further comprises deleting the software process associated with the unclassified event when the unclassified event is determined as being anomalous.

In one aspect, the method further comprises alerting a user of the client device when the unclassified event is determined as being anomalous.

In another aspect a system is disclosed for providing a set of convolutions to a computing device for detecting anomalous events occurring in an operating system of the computing device, the system comprising: a computer processor configured to: launch an agent in an operating system of a client device; register, by the agent that is launched, events occurring in the operating system of the client device; for each registered event occurring in the operating system of the client device, determine a context of the event, wherein the context comprises a call stack at a moment of occurrence of the event; select a set of features based on the call stack of the event; generate a convolution based on the selected set of features of the event and the context of the event; and add the generated convolution to a set of convolutions of events occurring on client devices; and provide, to a client device from which a request is received, the set of convolutions of events occurring on client devices, the set of convolutions being provided to the client device for detecting anomalous events.

In another aspect, a non-transitory computer readable medium is provided for storing thereon computer executable instructions for providing a set of convolutions to a computing device for detecting anomalous events occurring in an operating system of the computing device, including instructions for: launching an agent in an operating system of a client device; registering, by the agent, events occurring in the operating system of the client device; for each registered event occurring in the operating system of the client device, determining a context of the event, wherein the context comprises a call stack at a moment of occurrence of the event; selecting a set of features based on the call stack of the event; generating a convolution based on the selected set of features of the event and the context of the event; and adding the generated convolution to a set of convolutions of events occurring on client devices; and providing, to a client device from which a request is received, the set of convolutions of events occurring on client devices, the set of convolutions being provided to the client device for detecting anomalous events.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
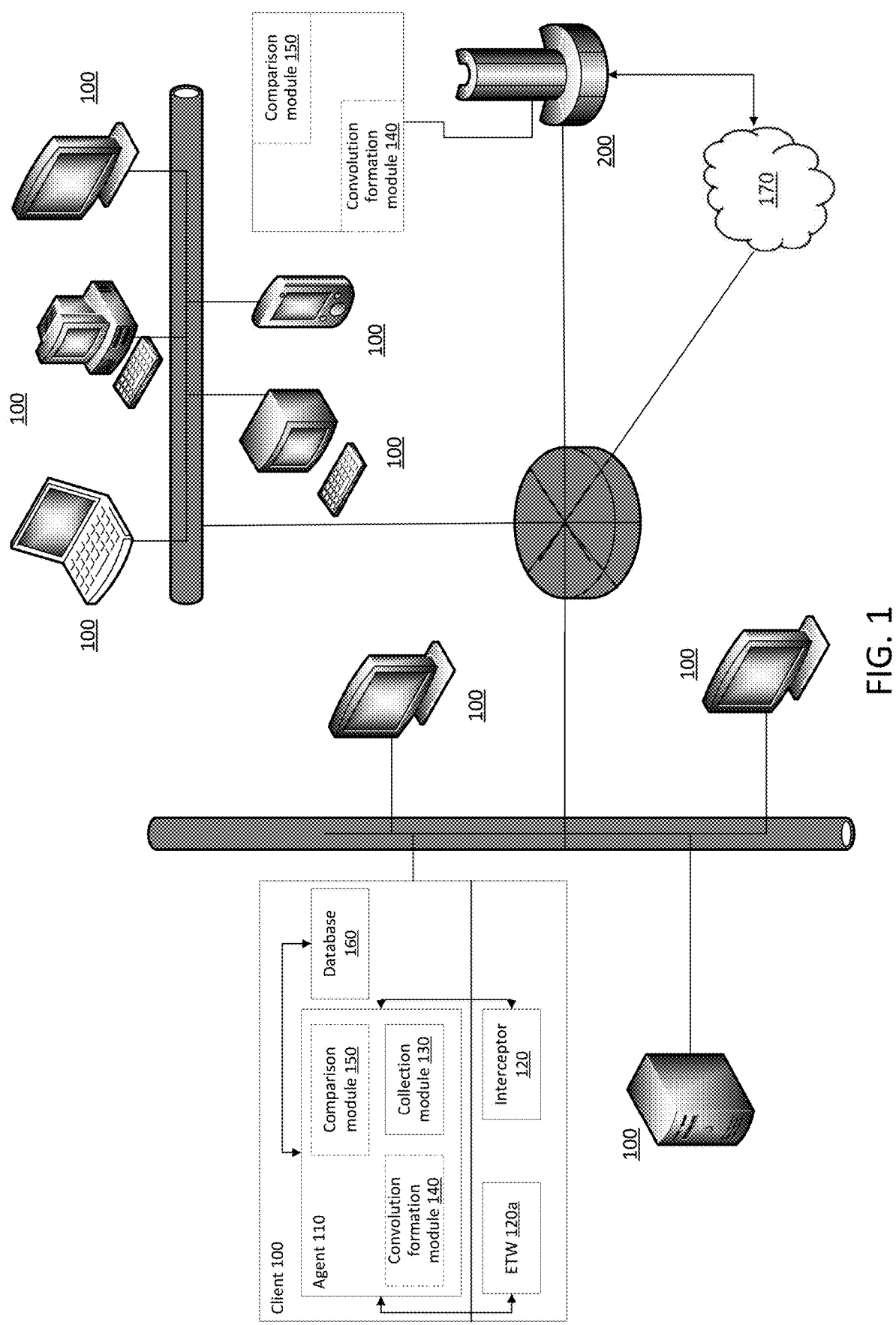
FIG. 1 illustrates a block diagram of a system of monitoring the execution of software installed on a client according to an exemplary aspect.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

As described herein, a "module" (or program module) can be considered a program object containing code that expands the functionality of a process that has been initiated, such as an operating system kernel module, or a dynamic library.

As described herein, "convolution" can be considered, for example, an intelligent hash where features of an event are convoluted into a string or also a vector where the features of an event are convoluted into coordinates and the like. In general, it is any object into which the features of an event (hereafter, "features") can be convolved for carrying out mathematical and logic operations on them. For example, the convolving of features is an arbitrary transformation of features into a string representation, a vector representation, or a combination of these.

An "event" as described herein can be an identified manifestation of a certain condition of an operating system, a service or a network. Information about the event may be contained in a software message, for example, from the operating system (or a portion thereof), indicating what has taken place. In other words, events from the operating system include anything "outside" of the program that can affect how the program behaves. It should be appreciated that such events can occur at any time while the program is running, in almost any order. Moreover, according to the exemplary aspect, there can usually be many kinds and types of events in the system, for example, the launching of processes; the loading of modules; file operations; registry operations; and the like. Moreover, in an exemplary aspect, the context of an event is the totality of states of the operating system at the moment of occurrence of the events which directly affect its occurrence. Examples of context content will be indicated below.

In addition, in general, an "anomalous" event is an identified manifestation of a certain condition of an operating system, a service or a network indicating the occurrence of a previously unknown situation. In a particular instance, an anomalous event is a secure event—an identified manifestation of a certain condition of a system, a service or a network indicating a possible violation of the information security policy or a failure of defensive measures, or the occurrence of a previously unknown state which may have a relation to security.

FIG. 1 illustrates a block diagram of a system of monitoring the execution of software installed on a client according to an exemplary aspect. As shown, a software agent 110 (i.e., an "agent") is installed on the side of the client 100. Also in the operating system of the client 100, one or more interceptors 120, connected to the agent 110, can be installed. In a particular aspect, event tracing for windows ("ETW") 120a, as known to those skilled in the art, can be used as the interceptors. The interceptors 120 are provided is to detect events occurring in the operating system and communicate this detection to the agent 110, for example, by sending a notification directly to the agent 110, and/or by an entry in the events log (not indicated in FIG. 1, but stored in the local database 160) to which the agent 110 has access.

Moreover, the agent 110 may receive notifications either on all possible events in the system which can be detected by the interceptors 120 or only on one kind of events of interest (such as only the launching of processes). The agent 110 can include a collection module 130 that is used after the agent registers an event of interest detected by the interceptors 120. The collection module 130 obtains the context of the event registered. In a particular instance, the context of the event includes the call stack preceding the occurrence of the event and the dump of the memory section containing the code that was being executed at the moment of occurrence of the event. Using the call stack, one or more of the following can be obtained: at least a list of procedures and functions being executed at the given moment of time, the list of modules containing those procedures and functions, and also the types and values of all parameters being transferred to the modules, for example, upon calling of functions exported by a module. In addition, the context may include information on jumps from at least the Last Branch Record ("LBR") and the Branch Trace Store ("BTS") (as described in Intel® Microarchitecture Codename Nehalem Performance Monitoring Unit Programming Guide, the contents of which are incorporated herein by reference)— memory buffers and registers. In this aspect, the LBR and BTS contain information on the program execution, i.e., the addresses of jumps, execution branches, and the like (otherwise preserving the given traces). In a particular aspect, the interceptors 120 upon detecting an event preserve its context, which will then be obtained by the collection module 130 of the agent 110 (for example, transferred to the collection module 130 or requested by the collection module 130) and in such cases the collection module 130 has no need to independently receive the entire required context or a certain portion of it.

According to an exemplary aspect, one or both of the client 110 and the server 200 can further include a convolution formation module 140. In this aspect, the context obtained by the collection module 130 is sent to the convolution formation module 140. In one instance, this may be sent to the convolution formation module 140 present at the client 100, in another instance it may be sent to the server 200. The convolution formation module 140 extracts from the received context the features (examples of features will be described below) and forms/generates a convolution. Likewise, the convolution formation module 140 transforms the context of the event (see below). As stated, convolution according to the exemplary aspect is taken in its broadest meaning, not only for a particular hash (where the features are convolved into a string) but also a vector (where the features are convolved into coordinates) and others—in other words, any object into which the features of an event may be convolved in order to carry out mathematical and logic operations on them. The forming of the convolutions of events for any given algorithms may be used in which, for example, hashes for files are formed from the obtained features, for example, as described in Russian Patent Publication No. RU 2,580,036, or vectors can be formed for files, for example, as described in Russian Patent Publication No. RU 2,614,557, or HTML pages. The contents of Russian Patent Publication Nos. RU 2,580,036 and RU 2,614,557 are hereby incorporated by reference in their entirety.

Furthermore, according to an exemplary aspect, a comparison module 150 may be located either at the server 200 and/or at the client 110. This comparison module 150 is configured to determine the popularity of the resulting convolution of the event and to compare the resulting convolution with other convolutions, such as convolutions contained in a set of secure convolutions which is kept in a local database 160 or a remote database 170, interacting as well with the server 200. The local database 160 also keeps the events log and the context of events previously detected, especially events of loading modules into processes.

The system described above is used for monitoring of the execution of software installed on clients 100. As a result of such monitoring, anomalous events are detected in the operating system which may be the result of an exploitation of a vulnerability of the software installed on the client 100. It is noted that the term "client" 100 in the present disclosure is employed in the client-server paradigm, i.e., it is an element of a computing architecture, and not a network one. By client 100 is meant in the present disclosure any computing device in a network which requests through an agent 110 services which are provided by the interface of a server 200, and by server 200 is meant any computing device with which said agent 110 of a client 100 interacts, obtaining collected data from the agent 110 and sending to it messages and commands (thereby providing services to the client 100). Next, methods are described that can be implemented by the disclosed for monitoring the execution of software installed on clients 100.

Figure 2:
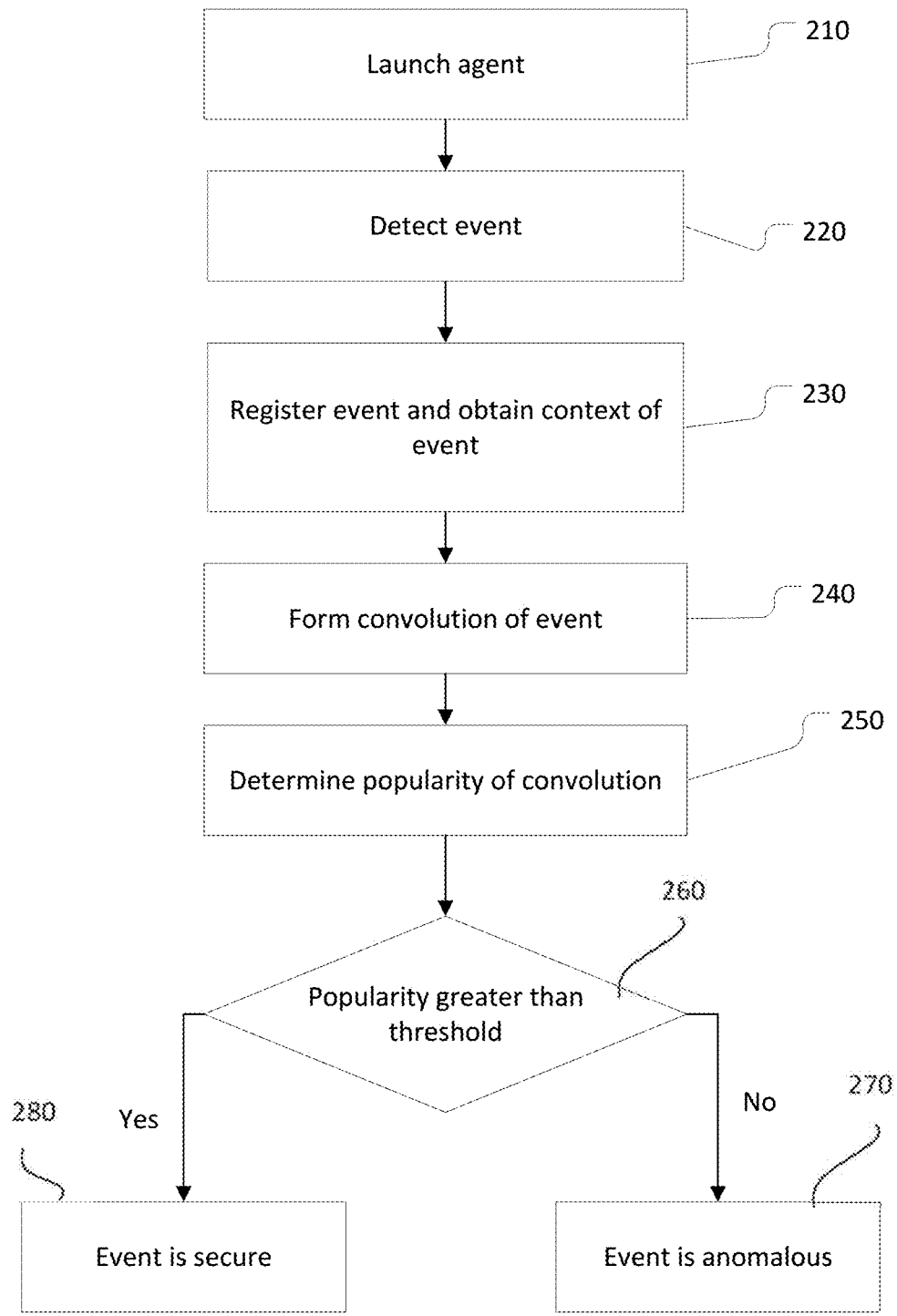
FIG. 2 illustrates a flowchart for method of detecting anomalous events based on an evaluation of the popularity of convolutions of events according to an exemplary aspect.

FIG. 2 illustrates a flowchart for method of detecting anomalous events based on an evaluation of the popularity of convolutions of events according to an exemplary aspect. As shown, in step 210, there is launched in the operating system at the client 100 side an agent 110 which registers events occurring in the operating system of the client 100 during the execution of processes. Next, in step 220, interceptors 120 installed in the operating system of the client 100, and connected to the agent 110, detect an event occurring in the operating system and report this to the agent 110, which in step 230 registers the event occurring, and receives with the aid of the collection module 130 the context of that event.

According to an exemplary aspect, the context may include, for example, at least the call stack at the moment of occurrence of the event, where there is obtained from the call stack at least a list of procedures and functions being executed at the given moment of time, a list of modules containing those procedures and functions, and also the types of data and the values of all parameters being transferred to the modules. Moreover, the call stack may include, for example, the dump of the memory section (address space) of the process containing the code which was being executed at the moment of occurrence of the event; information on jumps from at least the LBR and the BTS; and/or a list of modules which were loaded into the process prior to the occurrence of the event, information on this being accessible, for example, in the events log kept in the local database 160.

Having obtained the context, in step 240 the convolution formation module 140 selects from this the features for formation of the convolution of the event on the basis of these features. Prior to selecting the features, in a particular instance, it is necessary to transform the obtained context. The transformation of a context is a complex of methods and algorithms aimed at optimizing the representation and formats of data from the standpoint of the problems being solved and the goals of the analysis. The transformation of the context does not set itself the goal of changing the informational content of the data which includes the context. The transformation is executed to present the context in such a form that the data may be used most effectively (an example of a transformation shall be given below).

According to exemplary aspect, the transformation of data for performing the convolution can be, for example, quantization; sorting; merging (pasting); grouping; data set configuration; tabularization of values; calculable values; data coding; normalization (scaling).

For example, the call stack (also true of the dump, an example of which is provided below) is transformed in the following way: debugging symbols are obtained for the modules participating in the call stack; the call stack is normalized by the use of the debugging symbols. Before applying the debugging symbols to the results of disassembly of the dump:

```
.text:00428339 loc_428339:              ; CODE XREF: _wmain+159↑j
.text:00428339      mov     ecx, [esp+4Ch+var_3C]
.text:0042833D      push    edi
.text:0042833E      call    sub_404D95
.text:00428343      or      [esp+4Ch+var_4], 0FFFFFFFFh
.text:00428348      lea     ecx, [esp+4Ch+var_38]
.text:0042834C      call    sub_401274
.text:00428351
.text:00428351 loc_428351:              ; CODE XREF: _wmain+51↑j
```

After applying the debugging symbols:

```
.text:00428339 loc_428339:              ; CODE XREF: _wmain+159↑j
.text:00428339      mov     ecx, [esp+4Ch+_pluginsList] ; this
.text:0042833D      push    edi             ; storage
.text:0042833E      call    PluginsList::LoadFromStorage(Storage const &)
.text:00428343      or      [esp+4Ch+var_4], 0FFFFFFFFh
.text:00428348      lea     ecx, [esp+4Ch+var_38] ; this
.text:0042834C      call    boost::detail::shared_count::~shared_count(void)
.text:00428351
.text:00428351 loc_428351:              ; CODE XREF: _wmain+51↑j
```

With the help of disassembly and emulation, a set of features is obtained for the obtained dump (presence/absence of indirect calls, position independent code, self-modifying code, and so on). After the transformation, the features are selected and the convolution is formed. As indicated, the features used are: the names of the modules loaded and the sequence of their loading (taken from the events log), the names of the procedures and functions being implemented at the given time, the values of the parameters being transferred to the modules prior to the call for procedures and functions being exported by these modules (taken from the call stack), information on jumps (taken from the dump, LBR, BTS), the presence/absence of indirect calls, position independent code, self-modifying code (dump). The convolution may be formed by any method known from the prior art. The transformation of the context, as well as the formation of the convolution, may be done either at the client 100 side or at the server 200 side (this is true of all methods carried out by the system of monitoring of the execution of software), for the performance of these operations at the server 200 side the context (for the transformation) and the features (for the formation of the convolution) are first sent to the server 200 by the client 100. In step 250 the popularity of the convolution of the event at the given moment of time is determined. According to the exemplary aspect, the popularity is determined by polling a database (local database 160 or remote database 170).

Moreover, according to an exemplary aspect, the popularity is considered, as computed by a particular method either the total number of detections of events at the current moment of time whose convolution popularity is being determined; and/or the number of clients 100 on which the given event whose convolution popularity is being determined has been detected at the current moment of time, regardless of the number of detections on the client. In other words, the popularity is being considered for the frequency of a plurality of detected events that correspond to the detected event of the client device 100 to determine how often the event is occurring in the set of the plurality of devices, for example. It should be appreciated that the current moment of time can be considered a certain point of time and over a given period of time (e.g., 1 microsecond, 1 second or the like, for example).

The popularity may also be global (within all accessible subnetworks) or local (popularity only within a certain subnetwork), for example, within that subnetwork in which the investigated event was detected. Thus, the databases 160 and 170 which are accessed in order to determine the popularity of the convolution of an event save a particular number, which in a particular instance is calculated by the server 200. In step 260, the event detected on the client 100 is judged to be anomalous if the popularity of the convolution of the detected event at the current moment of time is below a threshold value. This determination can be performed by the agent on the client device 100 (e.g., comparison module 150) and/or the comparison module 150 on the server 200, for example. If the popularity is greater than the threshold as determined at step 260, the event is determined to be secure at step 270. Otherwise, if the popularity is less than the threshold, the event is deemed anomalous at step 280. Appropriate action may be taken by the client 100 based on the determination of whether the detected event is anomalous as further described herein.

According to an exemplary aspect, there may be several techniques used to determine whether the detected event is anomalous. For example, the detected event can be determine to be anomalous if, for example, the local popularity of the convolution of the event is below a threshold value; the global popularity of the convolution of the event is below a threshold value; and/or the local and global popularity of the convolution of the event is below a threshold value.

The threshold values for the global popularity of the convolution of the event and the popularity in the subnetwork (local) are assigned independently. The events judged as being anomalous will be further investigated later on and if necessary they will be blocked on the clients 100 by the agent 110. For example, if the detected events are determined to be anomalous, the client device 100 (and/or agent 110) can be configured to perform a remediation action, such as, for example, deleting the software process that performed the anomalous event(s), quarantining that software process and/or alerting a user of the client device 110 that the software process may be malicious.

The system for monitoring the execution of software is also used to form the convolutions of secure events (consequently, this system may be used to obtain the convolution of any given event) and a set of convolutions of secure events. The set may already exist and then it is merely supplemented when carrying out the method, or it may also be absent and be created in the process of carrying out the method and will start to be filled up.

Figure 3:
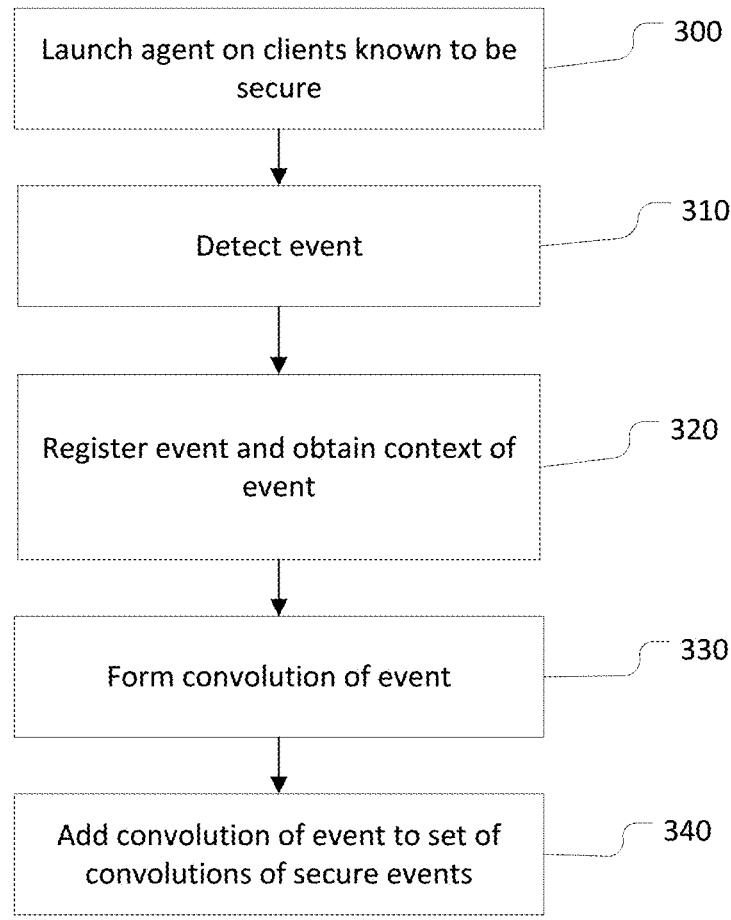
FIG. 3 illustrates a flowchart for a method of forming a set of convolutions of safe events according to an exemplary aspect.

FIG. 3 illustrates a flowchart for a method of forming a set of convolutions of safe events according to an exemplary aspect. As used herein, "secure events" can be considered "safe" events whose occurrence is not the result of an exploitation of a vulnerability or the execution of a malicious software. In step 300, there is launched in the operating system on the side of at least one client 100 known to be secure (a secure client is a client not containing malicious software and not able to be attacked in the process of implementing the method by the exploitation of a vulnerability), an agent 110 (e.g., a first software agent) that registers events of at least one kind that occur in the operating system of the client 100, where the kinds of events may be one or more of: launching of processes; loading of modules; file operations; registry operations; and the like.

In step 310, the interceptors 120 installed in the operating system of the client 100, and connected to the agent 110, detect an event occurring in the operating system. Next, at step 320, the agent 110 registers the event occurring and obtains by the collection module 130 of the agent 110 the context of that event, one possible makeup of the context having been presented above. From the context, in step 330, the convolution formation module 140 selects the features and on the basis of the features selected it forms the convolution of the event, then adds the convolution of the event to the set of convolutions of secure events at step 340. In a particular instance, steps 330 to 340 are executed on the server 200 (for which the context obtained from the clients 100 in step 320 is relayed to the server in "raw" or already transformed form), and the set of convolutions of secure events is kept in the remote database 170 and may afterwards be loaded onto any given client 100, or the client 100 may organize a polling of the database 170, without loading the entire set into the local database 160.

The sets of convolutions of secure events are used to detect anomalous events on clients 100. The set itself may be stored either locally in the database 160 or remotely in the remote database 170, which may be accessed by the client 100.

Figure 4:
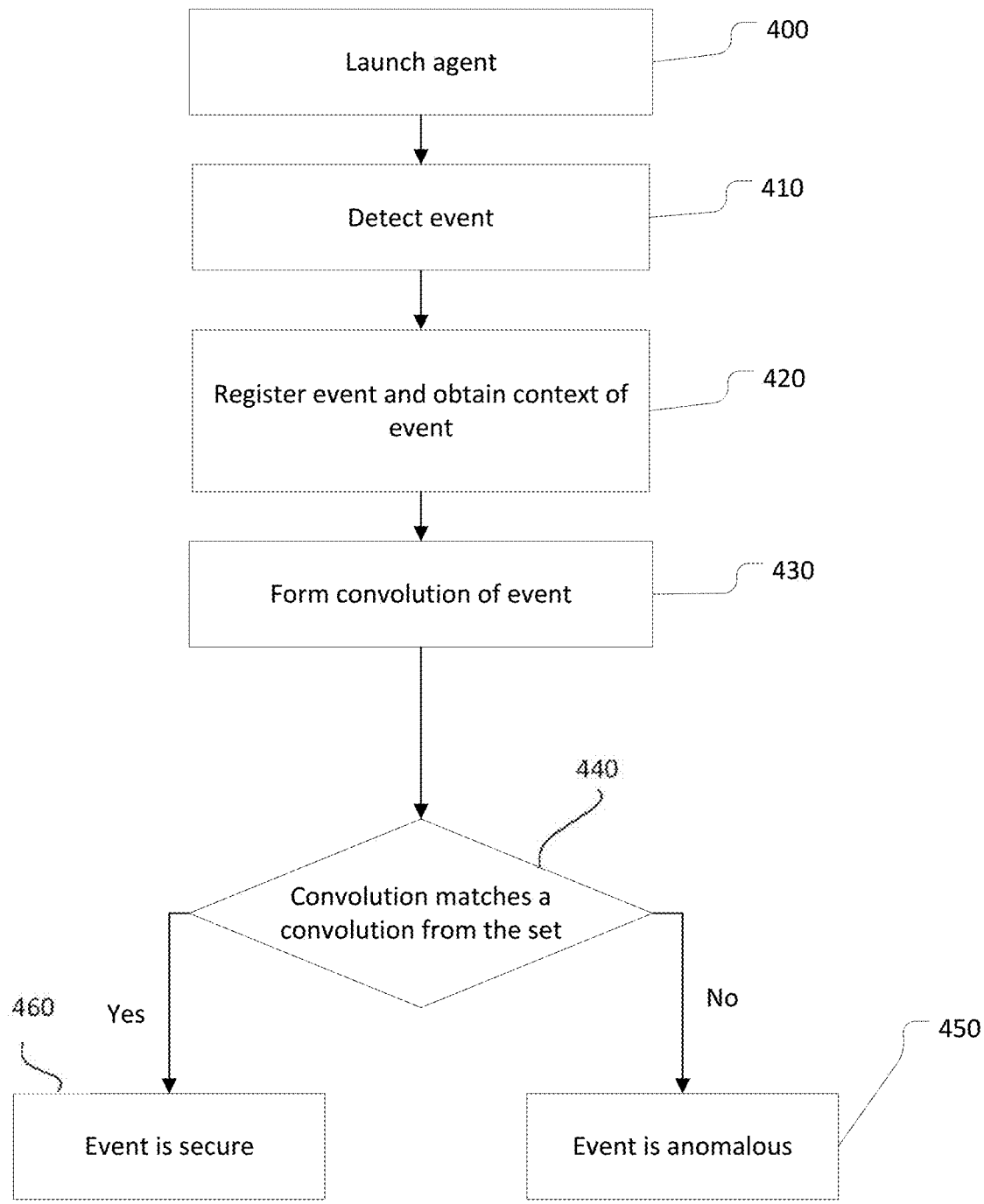
FIG. 4 illustrates a flowchart for a method of detecting an anomalous event based on a set of convolutions of safe events according to an exemplary aspect.

FIG. 4 illustrates a flowchart for a method of detecting an anomalous event based on a set of convolutions of safe events according to an exemplary aspect. Likewise, as in all other methods, in step 400 there is launched in the operating system at the client 100 side another agent 110 (e.g., a second software agent) that registers events occurring in the operating system of the client 100, in step 410 the interceptors 120 installed in the operating system and connected to the agent 110 detect the event which has occurred in the operating system. For example, in the exemplary aspect, these new events can be considered "unclassified" as they have not yet determined whether to be anomalous or safe/ secure. Next at step 420, the agent 110 registers the unclassified event occurring and obtains the context of that event, one possible makeup of the context having been presented above. From the context, in step 430, the features are selected and on the basis of the features selected the convolution of the unclassified event is formed. The obtained convolution of the unclassified event is compared in step 440 with the group of previously formed convolutions of secure/safe events from the set formed by the method described above. Next, at step 450, the unclassified event is judged to be anomalous if, upon comparison, the formed convolution of the detected event does not match up with any convolution of an event from the group of convolutions of events from the indicated set of secure/safe events. Otherwise, the unclassified event is deemed secure as shown at step 460, for example. In one aspect, if the unclassified event is determined to be anomalous, the software process associated with the unclassified event can be deleted or quarantined from the client device.

In general, in the present disclosure, by agent 110, interceptors 120, collection module 130, convolution formation module 140, and comparison module 150 can be implemented using, for example, real devices, systems, components, a group of components realized with the use of hardware, such as integrated microcircuits (application-specific integrated circuits (ASIC)) or field-programmable gate arrays (FPGA)) or, for example, in the form of a combination of software and hardware, such as a microprocessor system and set of program instructions, and also on neurosynaptic chips. The functionality of the agent 110, the interceptors 120, the collection module 130, the convolution formation module 140, and the comparison module 150 may be realized exclusively by hardware, and also in the form of a combination, where some of the functionality is realized by software, and some by hardware. In some variant aspects, a portion of the agent 110, the interceptors 120, the collection module 130, the convolution formation module 140, and the comparison module 150 may be implemented on the processor of a general-purpose computer (such as that shown in FIG. 5 and described below), which also applies to both the client 100 and the server 200.

Figure 5:
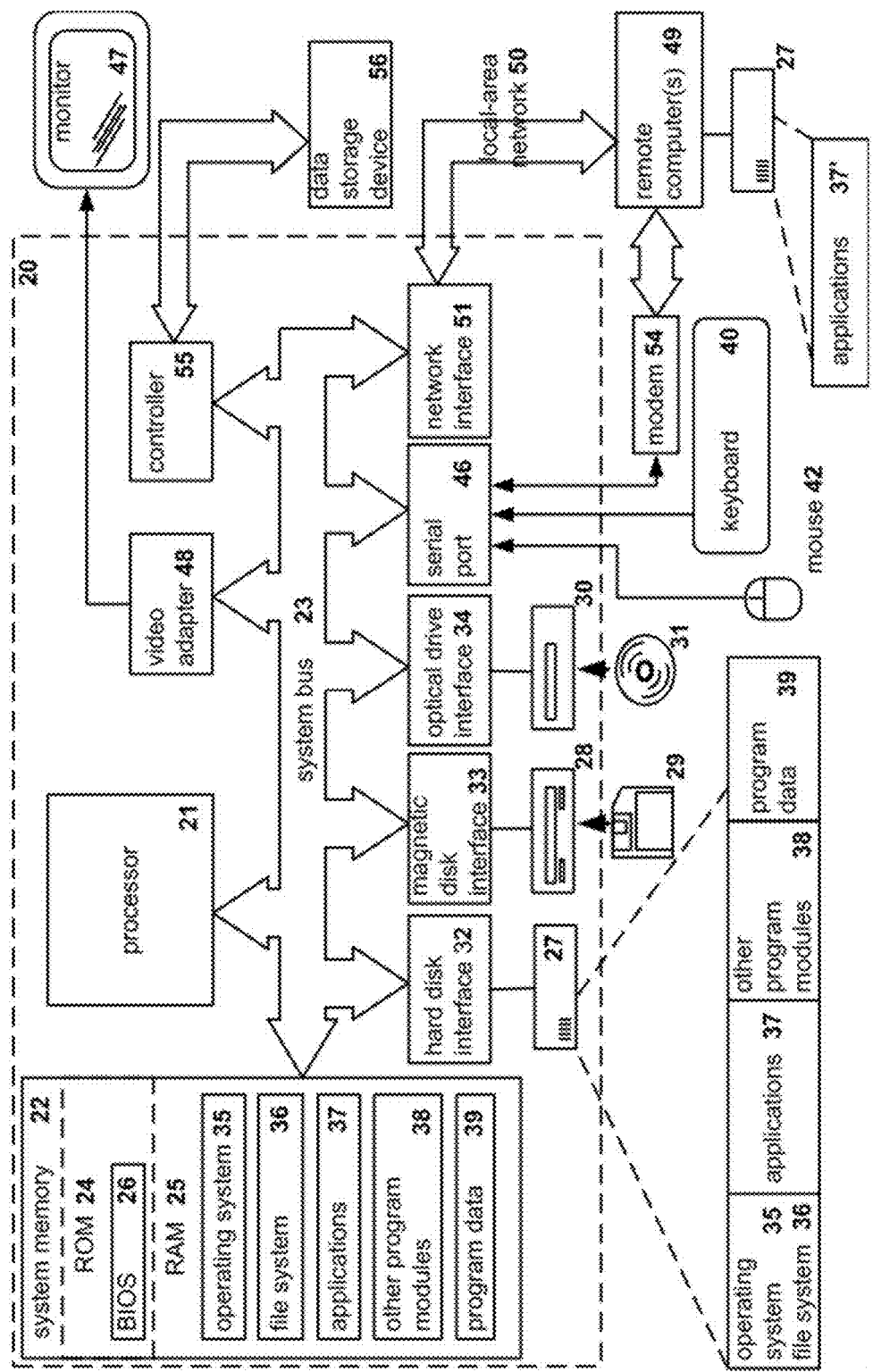
FIG. 5 illustrates an example of a general-purpose computer system (which may be a personal computer or a server) on which the disclosed systems and method can be implemented according to an example aspect.

Specifically, FIG. 5 illustrates an example of a general-purpose computer system (which may be a personal computer or a server) on which the disclosed systems and method can be implemented according to an example aspect. As shown, the computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein

What is claimed:

1. A method for providing a set of convolutions to a computing device for detecting anomalous events occurring in an operating system of the computing device, the method comprising:
    launching an agent in an operating system of a client device;
    registering, by the agent, events occurring in the operating system of the client device;
    for each registered event occurring in the operating system of the client device,
        determining a context of the event, wherein the context comprises a call stack at a moment of occurrence of the event;
        selecting a set of features based on the call stack of the event, the set of features comprising one or more of: names of loaded modules of the computing device, sequences of loading the modules, names of procedures and functions being implemented at the moment of occurrence of the event, values of parameters being transferred to the modules prior to the call for procedures and functions being exported by said modules, a presence or absence of at least one indirect call, a position independent code, and information on jumps, the information being obtained from a self-modifying code, a last branch record (LBR), a branch trace store (BTS);
        generating a convolution based on the selected set of features of the event and the context of the event; and
        adding the generated convolution to a set of convolutions of events occurring on client devices; and
    providing, to a client device from which a request is received, the set of convolutions of events occurring on client devices, the set of convolutions being provided to the client device for detecting anomalous events.

2. The method of claim 1, wherein the events occurring in the operating system of the client device comprise at least one of: a launching of a process, a loading of a computer executable program code, a file operation, and a registry operation.

3. The method of claim 1, wherein the providing of the set of convolutions to the client device comprises loading the set of convolutions onto the client device.

4. The method of claim 1, wherein the providing of the set of convolutions to the client device comprises organizing a polling of a database without loading the set of convolutions into a local database of the client device.

5. The method of claim 1, further comprising:
registering, by an agent of a client device, at least one unclassified event; and
determining, by the agent of the client device, whether or not the at least one unclassified event is anomalous based on a comparison of a convolution generated based on selected features of the unclassified event with the set of convolutions of events occurring on client devices.

6. The method of claim 5, further comprising:
deleting the software process associated with the unclassified event when the unclassified event is determined as being anomalous.

7. The method of claim 5, further comprising:
alerting a user of the client device when the unclassified event is determined as being anomalous.

8. A system for providing a set of convolutions to a computing device for detecting anomalous events occurring in an operating system of the computing device, the system comprising:
a computer processor configured to:
launch an agent in an operating system of a client device;
register, by the agent that is launched, events occurring in the operating system of the client device;
for each registered event occurring in the operating system of the client device,
determine a context of the event, wherein the context comprises a call stack at a moment of occurrence of the event;
select a set of features based on the call stack of the event, the set of features comprising one or more of: names of loaded modules of the computing device, sequences of loading the modules, names of procedures and functions being implemented at the moment of occurrence of the event, values of parameters being transferred to the modules prior to the call for procedures and functions being exported by said modules, a presence or absence of at least one indirect call, a position independent code, and information on jumps, the information being obtained from a self-modifying code, a last branch record (LBR), a branch trace store (BTS);
generate a convolution based on the selected set of features of the event and the context of the event; and
add the generated convolution to a set of convolutions of events occurring on client devices; and
provide, to a client device from which a request is received, the set of convolutions of events occurring on client devices, the set of convolutions being provided to the client device for detecting anomalous events.

9. The system of claim 8, wherein the events occurring in the operating system of the client device comprise at least one of: a launching of a process, a loading of a computer executable program code, a file operation, and a registry operation.

10. The system of claim 8, wherein the providing of the set of convolutions to the client device comprises loading the set of convolutions onto the client device.

11. The system of claim 8, wherein the providing of the set of convolutions to the client device comprises organizing a polling of a database without loading the set of convolutions into a local database of the client device.

12. The system of claim 8, wherein the processor is further configured to:
register, by an agent of a client device, at least one unclassified event; and
determine, by the agent of the client device, whether or not the at least one unclassified event is anomalous based on a comparison of a convolution generated based on selected features of the unclassified event with the set of convolutions of events occurring on client devices.

13. The system of claim 12, wherein the processor is further configured to:
delete the software process associated with the unclassified event when the unclassified event is determined as being anomalous.

14. The system of claim 12, wherein the processor is further configured to:
alert a user of the client device when the unclassified event is determined as being anomalous.

15. A non-transitory computer readable medium storing thereon computer executable instructions for providing a set of convolutions to a computing device for detecting anomalous events occurring in an operating system of the computing device, including instructions for:
launching an agent in an operating system of a client device;
registering, by the agent, events occurring in the operating system of the client device;
for each registered event occurring in the operating system of the client device,
determining a context of the event, wherein the context comprises a call stack at a moment of occurrence of the event;
selecting a set of features based on the call stack of the event, the set of features comprising one or more of: names of loaded modules of the computing device, sequences of loading the modules, names of procedures and functions being implemented at the moment of occurrence of the event, values of parameters being transferred to the modules prior to the call for procedures and functions being exported by said modules, a presence or absence of at least one indirect call, a position independent code, and information on jumps, the information being obtained from a self-modifying code, a last branch record (LBR), a branch trace store (BTS);
generating a convolution based on the selected set of features of the event and the context of the event; and
adding the generated convolution to a set of convolutions of events occurring on client devices; and
providing, to a client device from which a request is received, the set of convolutions of events occurring on client devices, the set of convolutions being provided to the client device for detecting anomalous events.

16. The non-transitory computer readable medium of claim 15, wherein the events occurring in the operating system of the client device comprise at least one of: a launching of a process, a loading of a computer executable program code, a file operation, and a registry operation.

17. The non-transitory computer readable medium of claim 15, wherein the providing of the set of convolutions to the client device comprises loading the set of convolutions onto the client device.

18. The non-transitory computer readable medium of claim 15, wherein the providing of the set of convolutions to the client device comprises organizing a polling of a database without loading the set of convolutions into a local database of the client device.

19. The non-transitory computer readable medium of claim 15, the instructions further comprising instructions for:
- registering, by an agent of a client device, at least one unclassified event; and
- determining, by the agent of the client device, whether or not the at least one unclassified event is anomalous based on a comparison of a convolution generated based on selected features of the unclassified event with the set of convolutions of events occurring on client devices.

20. The non-transitory computer readable medium of claim 19, the instructions further comprising instructions for:
- deleting the software process associated with the unclassified event when the unclassified event is determined as being anomalous.

21. The non-transitory computer readable medium of claim 19, the instructions further comprising instructions for:
- alerting a user of the client device when the unclassified event is determined as being anomalous.

* * * * *